United States Patent [19]

Cadars

[11] Patent Number: 4,592,418
[45] Date of Patent: Jun. 3, 1986

[54] DEGASSING DEVICE FOR A FLUID CIRCULATING IN A HEAT EXCHANGER

[75] Inventor: Patrick Cadars, Montigny le Bretonneux, France

[73] Assignee: Valeo, Paris, France

[21] Appl. No.: 586,752

[22] Filed: Mar. 6, 1984

Related U.S. Application Data

[62] Division of Ser. No. 270,643, Jun. 4, 1981, abandoned.

[30] Foreign Application Priority Data

Jun. 6, 1980 [FR] France .................. 80 12658

[51] Int. Cl.⁴ .............................................. F01P 11/02
[52] U.S. Cl. .................. 165/104.32; 123/41.54
[58] Field of Search ............... 165/104.32; 123/41.51, 123/41.54

[56] References Cited

U.S. PATENT DOCUMENTS

| | | | |
|---|---|---|---|
| 3,051,450 | 8/1962 | White et al. ........................ | 165/110 |
| 3,455,377 | 7/1969 | Hayes ............................ | 165/104.32 |
| 3,576,181 | 4/1971 | Neal et al. ...................... | 165/104.32 |
| 3,604,502 | 9/1971 | Morse et al. . | |
| 3,820,593 | 6/1974 | Pabst ............................... | 123/41.54 |
| 4,116,268 | 9/1978 | Kruger ............................ | 123/41.54 |

FOREIGN PATENT DOCUMENTS

| | | | |
|---|---|---|---|
| 2741353 | 3/1979 | Fed. Rep. of Germany . | |
| 2268157 | 4/1975 | France . | |
| 2443572 | 12/1979 | France . | |
| 918221 | 4/1961 | United Kingdom . | |
| 1270238 | 4/1972 | United Kingdom ............ | 123/41.54 |

Primary Examiner—Albert W. Davis, Jr.
Attorney, Agent, or Firm—Quaintance, Murphy & Presta

[57] ABSTRACT

In a heat exchanger with fluid flow tubes, a degassing device formed in a water box of the exchanger, said water box including first and second collecting chambers and a compensation chamber, communicating with the outlet pipe of the exchanger, and a narrow passage connecting the upper portion of the first collecting chamber with the compensation chamber by forming a siphon between said two chambers.

3 Claims, 13 Drawing Figures

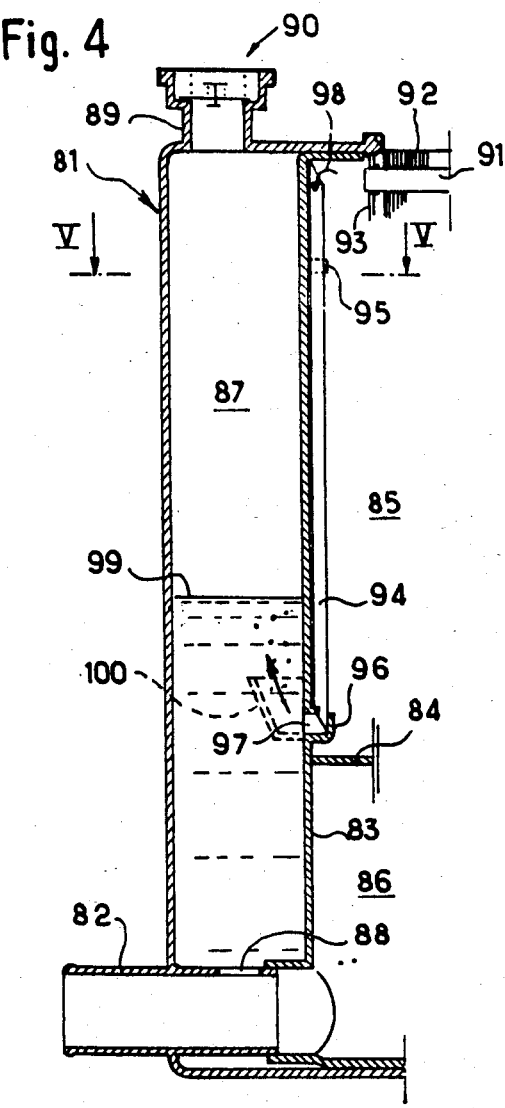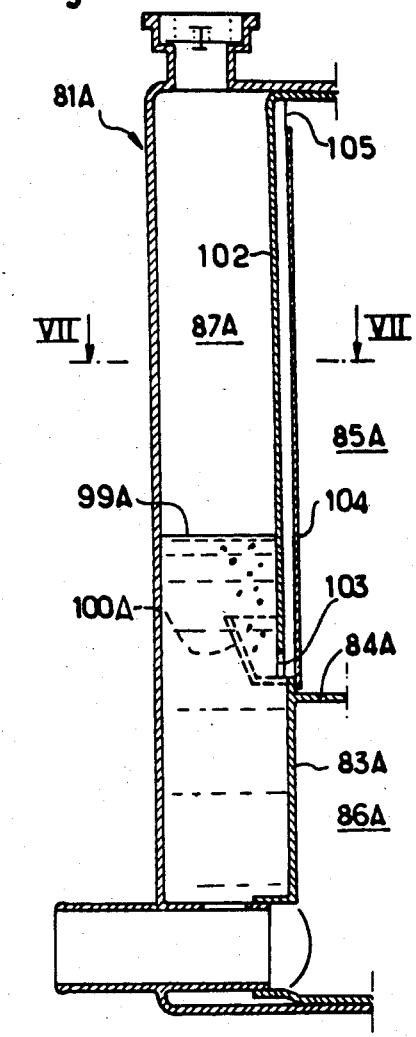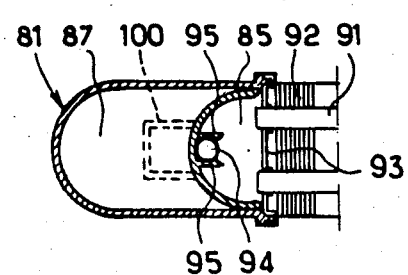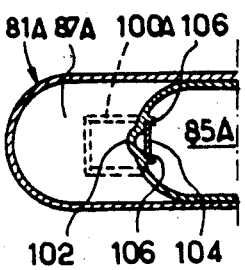

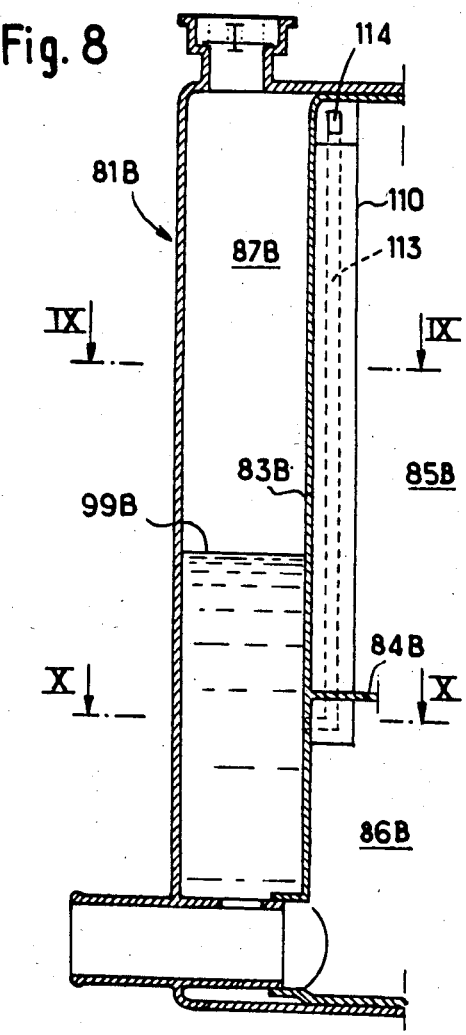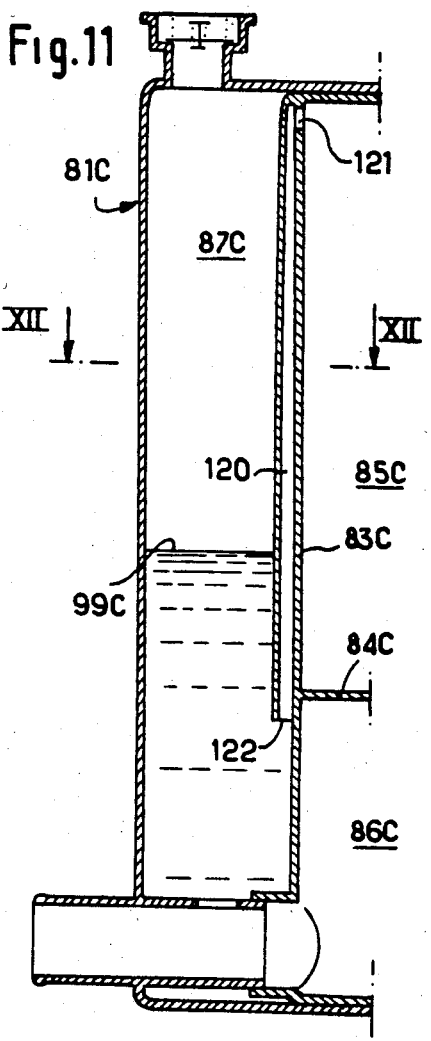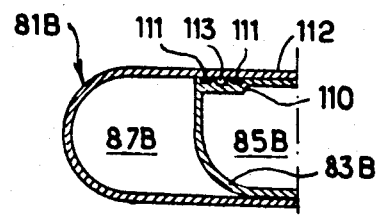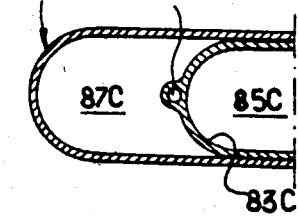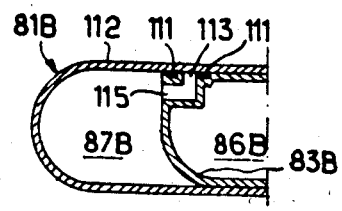

DEGASSING DEVICE FOR A FLUID CIRCULATING IN A HEAT EXCHANGER

This is a division of application Ser. No. 270,643, filed June 4, 1981, now abandoned.

BACKGROUND OF THE INVENTION

The present invention relates to a degassing device of a fluid flowing in a heat exchanger and, in particular, in a radiator which is part of the cooling circuit of a motor vehicle engine.

It is known that the presence of air bubbles in the cooling fluid of an internal combustion engine can be the cause of "hot points" appearing in the engine cylinder head and resulting in deterioration and destruction risks of some parts of the engine due to an inefficient cooling.

For avoiding such disadvantages, means for "trapping" said air bubbles and preventing them from circulating through the cooling circuit and from possibly gathering at some points of the engine cylinder head have already been proposed.

In particular in a heat exchanger with tubes, one of said known means provides, in a water box of the radiator and on either side of a partition wall, a collecting chamber in which emerge the exchanger tubes and a compensation chamber adapted for being partially filled with fluid and communicating on the one hand with the collecting chamber at the lower portion of the wall and on the other hand with the outer atmosphere at its upper portion (filled with gas) through overpressure and/or depression valves. The upper portion of said compensation chamber is also in communication with the collecting chamber via a degassing port formed in said partition wall.

In operation, the air of gas bubbles carried by the fluid gather at the upper portion of the collecting chamber and from there pass directly through said port into the compensation chamber where they are "trapped" due to the depression created in said chamber by the pump circulating the cooling fluid.

However, it has been found that when the engine is being stopped, the gases which are confined in the compensation chamber tend to flow back via said port into the collecting chamber and into the upper tubes of the nest, and can then reach the engine cylinder head if the latter is placed at a level higher than that of the radiator, hence the risk of "hot points" appearing when restarting the engine. Moreover, when the compensation chamber contains a detector of the fluid minimum level, the operation of said detector can be disturbed by a fluid jet penetrating into said chamber via said port.

OBJECT AND SUMMARY OF THE INVENTION

The object of the invention is a degassing device adapted to a heat exchanger, such as a radiator of an engine cooling circuit, which is not exhibiting such disadvantages.

Said exchanger comprises a water box in which are provided, separated by a partition wall, a collecting chamber and a compensation chamber, the collecting chamber communicating with the compensation chamber via an upper passage and a lower passage, and the upper passage, forming a siphon, starts from the upper level of the collecting chamber and opens into the compensation chamber under the level of the fluid contained therein.

This passage always contains fluid, whether the engine is running or stopped, and the gases confined in the compensation chamber are thus refrained from flowing back into the collecting chamber and thus into the rest of the circuit.

One avoids also the operation of a detector of the fluid minimum level in the compensation chamber from being disturbed by a fluid jet penetrating into said chamber.

BRIEF DESCRIPTION OF THE DRAWINGS

In the following description which is given by way of example, reference is made to the accompanying drawings wherein:

FIG. 4 is a longitudinal cross-sectional schematic view of a radiator water box, comprising a degassing device according to the invention, FIG. 5 is a transverse cross-sectional schematic view along line V—V of FIG. 4, FIG. 6 is a view similar to FIG. 4, but showing another embodiment of the invention, FIG. 7 is a transverse sectional view along line VII—VII of FIG. 6, FIG. 8 is a view similar to FIGS. 4 and 6, but for another embodiment of the invention, FIGS. 9 and 10 are transverse sectional views along lines IX—IX and X—X respectively of FIG. 8, FIG. 11 is a view similar to FIGS. 4, 6 and 8, but for another embodiment of the invention, FIG. 12 is a cross-sectional view along line XII—XII of FIG. 11.

DETAILED DESCRIPTION OF THE DRAWINGS

Figure 1:
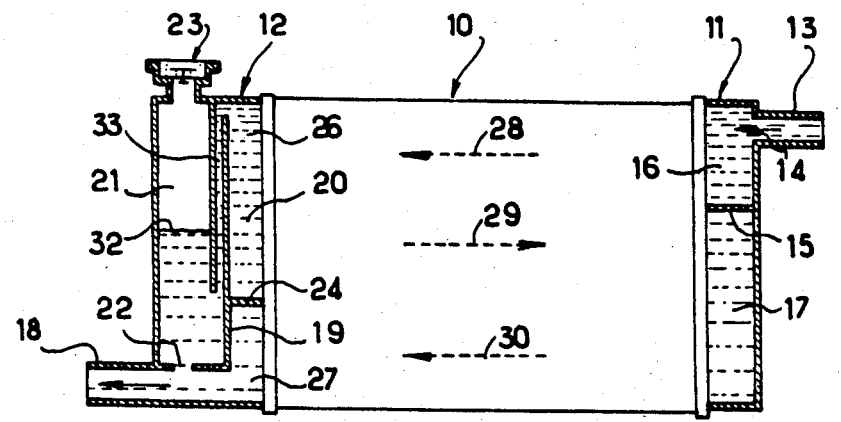
FIGS. 1, 2 and 3 are partial cross-sectional schematic views of three radiators of different types, comprising a degassing device according to the invention.

Reference is first made to FIG. 1 which shows schematically the principle of the degassing device according to the invention, applied to a heat exchanger forming the radiator of the cooling circuit of a motor vehicle engine, the circulation in the exchanger being of the "S" type.

The body 10 of the heat exchanger is a nest of horizontal finned tubes, associated at both ends with two water boxes 11 and 12 respectively. The first water box 11 comprises a pipe 13 for the inlet of the fluid in the exchanger, as is shown by arrow 14, and its inner space is divided, by a transverse wall 15, into two chambers 16 and 17, the inlet pipe 13 opening into chamber 16, and chamber 17 having a volume superior to that of chamber 16.

The second water box 12, comprising at its lower portion the outlet pipe 18 of the exchanger, is divided by a vertical wall 19 into a collecting chamber 20 into which emerge the ends of the tubes forming the exchanger body, and a compensation chamber 21 the inner portion of which is communicating via a port 22 with the outlet pipe 18, and the upper portion of which is communicating with the outer atmosphere via an overpressure and depression valve system 23.

The inner space of the collecting chamber 20 is divided by a transverse wall 24 into an upper chamber 26 and a lower chamber 27 having a volume inferior to that of chamber 26 and communicating with the outlet pipe 18.

In such an exchanger, the fluid circulates in the following manner: from the inlet pipe 13, it flows into the first chamber 16 of the first water box 11, circulates into the tubes of the exchanger in the direction shown by arrow 28, reaches chamber 26, then flows back through the tubes of the exchanger in the direction shown by arrow 29, flows into the second chamber 17 of the first water box 11, circulates again through the tubes of the exchanger in the direction shown by arrow 30, reaches the second chamber 27 of the collecting chamber 20 of the second water box 12, and reaches the outlet pipe 18. When the engine is running, chambers 16 and 17 of the first water box 11 as well as chambers 26 and 27 of the second water box are completely filled with fluid and said fluid fills the compensation chamber 21 at the level shown by reference numeral 32.

It has been established that when the fluid flowing through the exchanger contains air or gas bubbles, the latter tend to gather in the upper left-hand side corner of the exchanger, viz. of the collecting chamber 20, if no means are provided for getting rid of them, and can then move in the reverse direction in the circuit when the engine is stopped for gathering at certain points of the engine cylinder head. For avoiding this disadvantage, the invention provides a degassing device in the second water box 12, comprising a narrow upper passage 33 connecting the upper portion of the first collecting chamber 26 with the lower portion (filled with fluid) of the compensation chamber 21, the lower end of said narrow passage 33 opening under the level 32 of the fluid contained in chamber 21.

This device operates in the following manner: when the engine is running, the pump which sets the cooling fluid in circulation, (mounted downstream of the outlet channel 18 of the exchanger), creates a depression in chamber 21, the effect of which is a suction through the narrow passage 33 of the air or gas bubbles gathered at the upper portion of the first collecting chamber 26. The mixture of fluid and gas thus sucked flows through passage 33 and reaches the compensation chamber 21 under the level 32 of the fluid. The air and gas bubbles move then upwards up to the free surface 32 of the fluid. When the engine is stopped, the gas confined in the upper portion of the compensation chamber 21 cannot return to the first collecting chamber 26 because of the siphon formed by the narrow passage 33 and the lower portion filled with fluid of the compensation chamber 21, even in the case where a slight overpressure is established in the upper portion of chamber 21.

Figure 2:
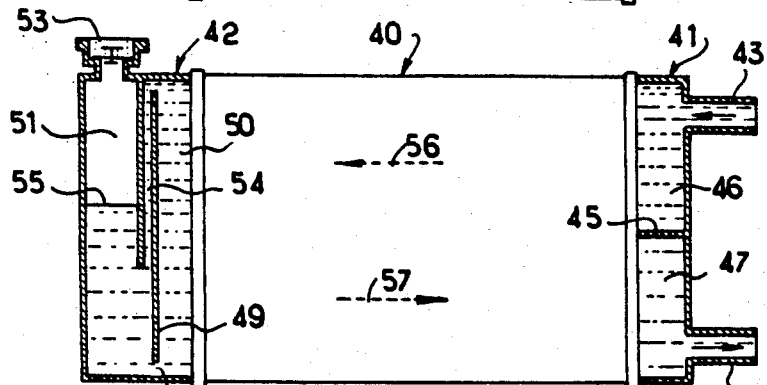

In FIG. 2 is schematically shown the application of the degassing device according to the invention to another heat exchanger of the so-called "U" circulation type. As in the embodiment of FIG. 1, the body 40 of said heat exchanger is formed of a nest of finned horizontal tubes, and is associated with two water boxes 41 and 42 into which the tubes emerge, at their ends. The first water box 41, comprising the fluid inlet pipe 43, is divided into two chambers 46 and 47 by a transverse wall 45. The inlet pipe 43 opens into the first chamber 46, while the second chamber 47 comprises the exchanger outlet pipe 48.

The second water box 42 is divided by a vertical wall 49 into a collecting chamber 50 into which emerge the tubes of the exchanger body, and a compensation chamber 51, the lower portion of which is in communication with the collecting chamber 50 via a port 52 and the upper portion of which is communicating with the outer atmosphere via an overpressure and depression valve system 53.

A vertical narrow passage 54 connects the upper portion of the collecting chamber 50 with the lower portion of the compensation chamber 51, and opens into the latter under the level 55 of the fluid contained therein.

In said heat exchanger, the fluid is conveyed by the inlet pipe 43 to the first chamber 46 of the water box 41, flows through a portion of the tubes of the exchanger in the direction shown by arrow 56, into the collecting chamber 50 of the other water box 42, flows through the other portion of the tubes of the exchanger in the direction shown by arrow 57, into the second chamber 47 of the first water box 41 and out via pipe 48. The degassing device operates as previously indicated.

Figure 3:
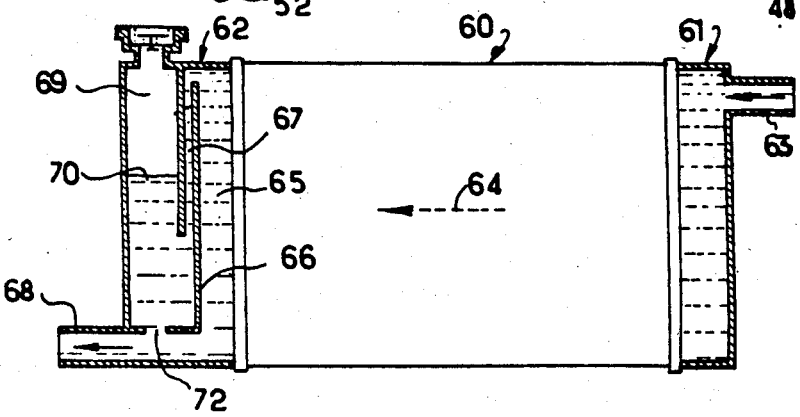

In another embodiment shown in FIG. 3, the exchanger is of the "I" circulation type, the body 60 of which being formed of a nest of horizontal finned tubes. Its first water box 61 comprising the inlet pipe 63 is not provided with a transverse partition wall, and the second water box 62 comprises the outlet pipe 68 at its lower portion. The fluid penetrating into the water box 61 via the inlet pipe 63 flows through the exchanger tubes in the direction shown by arrow 64, into the collecting chamber 65 defined in the second water box 62 by the wall 66, and reaches the outlet pipe 68. As previously, the degassing device is formed by a narrow passage 67 connecting the upper portion of the collecting chamber 65 with the lower portion of the compensation chamber 69, under the free surface 70 of the fluid contained therein. A port 72 establishes a communication between the lower portion of the compensation chamber 69 and the lower portion of the collecting chamber 65 or the outlet pipe 68. Generally, the invention is applicable to all types of heat exchangers with horizontal fluid flow tubes.

It should be appreciated also that if the compensation chamber 21, 51 or 69 contains a detector of the fluid minimum level, the mixture of fluid and gas exiting from the lower end of the narrow passage 33, 54 or 67 cannot have a disturbing effect on the operation of said detector.

Reference is now made to FIGS. 4 and 5, representing a particular embodiment of said narrow passage.

The water box 81 is of the type shown in FIG. 1, and comprises the outlet pipe 82 of the exchanger. A partition wall 83 fitted inside the water box 81 and integrally moulded with a transverse portion 84 oriented towards the nest of finned tube, divides the inside of the water box 81 into a first and a second collecting chambers, 85 and 86 respectively, and into a compensation chamber 87 the lower portion of which, normally filled with fluid, is in communication with the outlet pipe 82 via a port 88 and the upper portion of which, normally filled with gas, is in communication with the outer atmosphere via a mouthpiece closed by an overpressure and depression valve system 90. The tubes of the exchanger which are shown schematically at 91 are provided with fins 92 and have their ends fitted tightly into a hollowed plate 93, at the periphery of which is fixed the water box 81, in a standard manner.

The narrow passage previously described is formed here by a cylindrical tube 94, of small section, cut to the required length, placed in the first collecting chamber 85 and fixed to the inner wall 83. From the latter depend resiliently deformable lugs 95 provided for the fixation of tube 94 which is clamped between the lugs 95. The length of tube 94 is slightly less than the length of the collecting chamber 85, and the lower end of the tube 94 is received in a small trough 96 formed by the wall 83 protruding inside chamber 85. Opposite the small trough 96, the wall 83 is formed with an opening 97 establishing the communication between the lower end of tube 94 mounted in place in the small trough 96 and the compensation chamber 87. The ends of tube 94 are cut obliquely or bevelled so as to facilitate the passage of the gas bubbles at the upper end of tube 94, as is shown by arrow 98.

The small trough 96 is situated slightly above the transverse wall 84 and the opening 97 formed in the wall 83 emerges under the free surface 99 of the fluid contained in the compensation chamber 87.

As is shown in phantom lines in FIGS. 4 and 5, it is also possible to foresee a small trough 100 open at the top, formed integrally with the inner wall 83 and surrounding in the compensation chamber 87 the opening of port 97, for compelling the gas bubbles exiting from port 97 to move up towards the free surface 99 of the fluid, as shown by the arrow, and for avoiding said gas bubbles to be sucked by the outlet pipe 82 through port 88 and return into the cooling circuit to which is associated the heat exchanger.

FIGS. 6 and 7 show an alternative embodiment of said narrow passage, according which the inner wall 83A of the water box 81A comprises a substantially semi-cylindrical vertical moulded groove 102, with its concavity turned towards the first collecting chamber 85A, and extending over substantially the whole length of said chamber from the upper portion of the wall 83A down to a small distance from the transverse wall 84A separating the first collecting chamber 85A from the second collecting chamber 86A. At its lower end, said semi-cylindrical groove 102 is formed with a port 103 opening into the compensation chamber 87A under the fluid free surface 99A.

In chamber 85A, the semi-cylindrical groove 102 is closed by an added plate 104 providing a communication port 105 with the first collecting chamber 85A at its upper end, and closing substantially tightly said groove 102 over the whole rest of its length. The plate 104 is maintained in place by being clamped between the lugs 106 depending from the inner wall 83A.

As in the preceding embodiment, the opening of port 103 can be surrounded, in the compensation chamber 87A, by a small trough 100A opened at the top.

FIGS. 8 to 10 show another embodiment of the narrow passage according to the invention, in which the partition wall 83B fitted inside the water box 81B has a plane side portion 110, connected at right angles with the rest of said wall, and applied substantially tightly by means of two seals 111 on a plane side wall 112 of the water box 81B. Between the two seals 111 is formed by moulding a rectilinear groove 113 of substantially rectangular cross-section, extending substantially over the whole length of the first collecting chamber 85B and extending slightly below the transverse wall 84B separating the collecting chambers 85B and 86B. At its upper end, said groove 113 opens into the upper collecting chamber 85B via a port 114 of said portion 110, and its lower end is connected with a horizontal channel 115 opening into the compensation chamber 87B under the free surface 99B of the fluid contained therein.

As previously, means for guiding the air bubbles upwardly can be foreseen where channel 115 opens into the compensation chamber 87B.

FIGS. 11 and 12 show still an alternative embodiment according which the aforementioned narrow passage is formed by a cylindrical duct 120 made integrally by moulding in the inner wall 83C of the water box 81C. Said duct 120 extends over the whole length of the first collecting chamber 85C and also underneath the transverse wall 84C separating the collecting chambers 85C and 86C. At its upper end, it opens into the first collecting chamber 85C via a port 121 formed in the wall 83C and its opened lower end 122 emerges directly into the compensation chamber 87C, under the free surface 99C of the fluid contained in said chamber.

As in the preceding embodiments, means for guiding the air bubbles upwardly can be foreseen at the end 122 of said cylindrical duct 120.

Figure 13:
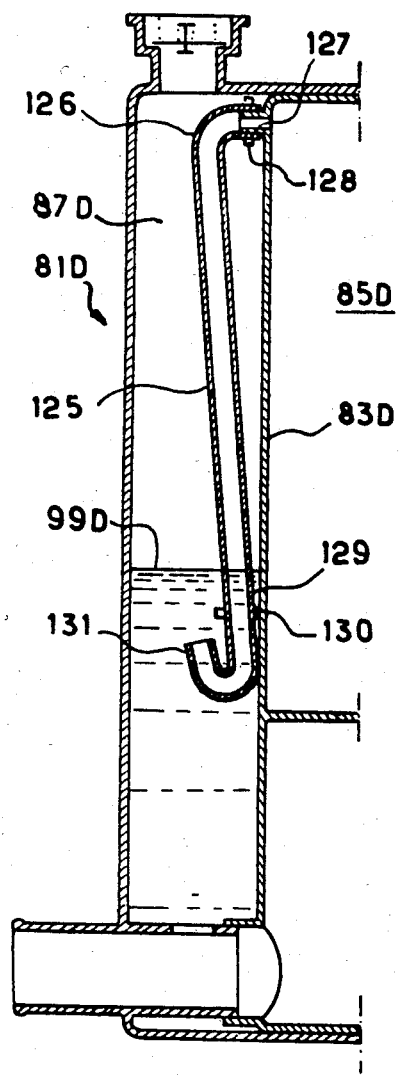
FIG. 13 is a view similar to FIGS. 4, 6, 8 and 11, but for another embodiment.

FIG. 13 shows another embodiment according which the narrow passage is formed by a tube 125 housed in the compensation chamber 87D of the exchanger water box 81D. The bent upper end 126 of tube 125 is fitted onto a mouth-piece 127 depending from the upper portion of the inner wall 83D separating the first collecting chamber 85D from the compensation chamber 87D and is fixed on said mouth-piece 127 by appropriate means 128.

The lower portion 129 of tube 125 is attached by any appropriate means 130, for example by clamping, on the inner wall 83D and ends into a U-bent section 131 opening under the level 99D of the fluid contained in chamber 87D.

What is claimed is:

1. A degassing device for a cooling fluid circuit, comprising a heat exchanger including a water box in which are defined a collecting chamber and a compensation chamber separated by a wall and communicating with each other via a lower passage and an upper passage, said upper passage extending substantially vertically along said wall from the upper portion of the collecting chamber and opening into the compensation chamber through a first port formed in said wall under the level of fluid present in said compensation chamber, said upper passage being a channel formed by molding into the thickness of said wall and communicating with the collecting chamber via a second port in said wall.

2. A device according to claim 1, wherein the upper passage forms a siphon between the two chambers.

3. A device according to claim 1, wherein the opening of the upper passage into the compensation chamber comprises means for guiding upwardly the gas bubbles.

* * * * *